US006112172A

United States Patent [19]
True et al.

[11] Patent Number: 6,112,172
[45] Date of Patent: Aug. 29, 2000

[54] INTERACTIVE SEARCHING

[75] Inventors: Sean D. True, Natick; Jonathan H. Young, Newtonville, both of Mass.

[73] Assignee: Dragon Systems, Inc., Newton, Mass.

[21] Appl. No.: 09/052,900

[22] Filed: Mar. 31, 1998

[51] Int. Cl.[7] ........................................................ G04F 7/00
[52] U.S. Cl. ................................ 704/235; 704/270; 707/3
[58] Field of Search ..................................... 704/235, 270; 707/3–5

[56] References Cited

U.S. PATENT DOCUMENTS

| | | |
|---|---|---|
| 4,181,821 | 1/1980 | Pirz et al. . |
| 4,227,176 | 10/1980 | Moshier . |
| 4,663,675 | 5/1987 | Jones, Jr. et al. . |
| 4,783,803 | 11/1988 | Baker et al. . |
| 4,805,218 | 2/1989 | Bamberg et al. . |
| 4,805,219 | 2/1989 | Baker et al. . |
| 4,823,306 | 4/1989 | Barbic et al. . |
| 4,829,576 | 5/1989 | Porter . |
| 4,931,950 | 6/1990 | Isle et al. . |
| 5,027,406 | 6/1991 | Roberts et al. . |
| 5,251,131 | 10/1993 | Masand et al. . |
| 5,267,345 | 11/1993 | Brown et al. . |
| 5,278,980 | 1/1994 | Pedersen et al. . |
| 5,392,428 | 2/1995 | Robins . |
| 5,404,295 | 4/1995 | Katz et al. . |
| 5,418,951 | 5/1995 | Damashek . |
| 5,425,129 | 6/1995 | Garman et al. . |
| 5,428,707 | 6/1995 | Gould et al. . |
| 5,454,063 | 9/1995 | Rossides . |
| 5,454,106 | 9/1995 | Burns et al. . |
| 5,500,920 | 3/1996 | Kupiec ..................................... 704/270 |
| 5,649,060 | 7/1997 | Ellozy et al. . |
| 5,835,667 | 11/1998 | Wactlar et al. .......................... 704/270 |

FOREIGN PATENT DOCUMENTS

| | | |
|---|---|---|
| 0 507 743 A2 | 7/1992 | European Pat. Off. . |
| 0 649 144 A1 | 4/1995 | European Pat. Off. . |
| WO96/13030 | 5/1996 | WIPO . |

OTHER PUBLICATIONS

Hiroshi Furukawa et al.; "Method of Topic Processing for Cooperative Dialog Systems"; IEEE; Mar. 20, 1995.
PCT International Search Report.
Bayya, Aruna et al., "Voice Map: A Dialogue–Based Spoken Language Information Access System," ICSLP 94 (1994), Yokohama, Japan, pp. 1259–1262.
Bennacef, S.K. et al., "A Spoken Language System For Information Retrieval, " ICSLP 94 (1994), Yokohama, Japan, pp. 1271–1274.
Feder, Judith D. et al., "Speech Recognition and Full–Text Retrieval: Interface and Integration," 16th Nat'l Online Meeting Proceedings, New York, May 2–4, 1995, sponsored by Learned Information, Inc., pp. 97–104.
Gorin, A.L. et al., "How May I Help You?," IVTTA, Sep. 30–Oct. 1, 1996, Basking Ridge, NJ, sponsored by the IEEE Communication Society, pp. 57–60.
Han et al., "A Voice System for the Computer Entry of Chinese Characters," Computer Speech and Language, vol. 7 (1993), pp. 1–13.
Philip, G. et al., "Design and Evaluation of a Speech Interface for Remote Database Searching," Journal of Information Science, vol. 17, Elsevier Science Publishers B.V. (1991), pp. 21–36.
Smith, F.J. et al., "Speech Access to a Document Database System," Information Technology for Organisational Systems, H.–J. Bullinger et al. (Eds.), Elsevier Science Publishers B.V., North Holland (1988), pp. 744–749.
Tatham, Mark, "Data Retrieval Using Voice," Institute of Electrical Engineers, London (1996), pp. Aug. 1–Aug. 2.
Marti A. Hearst; TileBars: Visualization of Term Distribution Information in Full Text Information Access; May 7, 1995; Xerox Palo Alto Research Center; pp. 5966.
PCT International Search Report; Aug. 9, 1999.

Primary Examiner—David R. Hudspeth
Assistant Examiner—Daniel Abebe
Attorney, Agent, or Firm—Fish & Richarson P.C.

[57] ABSTRACT

A user searches searchable information representing underlying information using an interactive user interface, which indicates to the user which parts of the searchable information represent information in the underlying information that is of interest to the user.

32 Claims, 10 Drawing Sheets

| Recognized Word | Confidence | Start Time | End Time |
|---|---|---|---|
| is | .63 | 372 | 377 |
| making | .8 | 379 | 402 |
| a | .33 | 404 | 407 |
| good | .45 | 410 | 422 |
| recovery | .38 | 425 | 490 |
| this | .98 | 495 | 512 |
| | | | |
| | | | |
| | | | |
| | | | |
| | | | |
| | | | |

64  58  60  62

INTERACTIVE SEARCHING

BACKGROUND OF THE INVENTION

This invention relates to interactive searching.

Referring to FIG. 1a, when a computer user needs to search a file of searchable information 1, such as a file containing the text of issued patents, he typically enters a query 2 containing keywords interconnected by boolean operators. A search engine 3 then searches the file of searchable information 1 for records (e.g., patents) which satisfy the query 2. Each record either satisfies or does not satisfy the query 2. The search engine 3 produces a set of hits 4 representing the records that satisfy the query. The hits 4 may be presented to the user in various ways. One common approach is to present the user with a list of the hits 4 and to allow the user to examine selected hits.

Referring to FIG. 1b, the searchable information 1 may be derived from underlying information 5. In some kinds of searching, the searchable information 1 may not always accurately represent the portions of the underlying information 5 that the user is trying to find. This is the case, for example, if the searchable information 1 is a text file generated by a speech recognizer from underlying information 5 representing speech, because the words produced by a speech recognizer are sometimes not the words that were spoken. Files generated by speech recognizers sometimes include not only the recognized words but also confidence levels indicating the likelihood that a spoken word was correctly recognized.

The information in the searchable information 1 may be derived from an audio signal that is linked to a video signal from, e.g., a television broadcast feed. Some files of this kind are extremely long.

SUMMARY OF THE INVENTION

In one aspect, the invention features a computer-implemented method that enables a user to control a search of a file that represents underlying raw information, and to find parts of the file that represent material of interest in the raw information. The user is enabled to define criteria applicable to the file and intended to locate parts of the file that tend to represent material in the raw information that may be of interest to the user. The file is searched in accordance with the criteria to find parts of the file that meet the criteria. A measure is defined of the degree to which the found parts represent material in the raw information that is of interest to the user, and an interactive user interface is provided which displays to the user the relationship between the found parts of the file and values of the defined measure with respect to the found parts and which changes the display in response to changes made by the user to a threshold associated with the defined measure.

The underlying raw information may be, for example, speech or text. The file may be text produced by a speech recognizer. The criteria may specify the presence of a particular utterance in speech. The interactive user interface may display to the user which found parts of the file satisfy the threshold.

The defined measure may relate to confidence levels. Confidence levels may be descriptive of degrees to which parts of the file correspond to parts of the raw information. The interactive user interface may display a bar chart with bars representing the relationship between the found parts of the file and values of the defined measure. The bar chart may indicate the locations of the found parts within the file.

The user may change the threshold to a new value by indicating, with a pointer device, a location on the bar chart corresponding to the new value. The interactive user interface may display to the user a representation of the raw information. The interactive user interface may display a representation of a part of the raw information corresponding to a part of the file indicated by the user.

Among the advantages of the invention are one or more of the following.

The graphical display of query results provides the user with an easily digested visual overview of the extent to which segments of the transcript relate to topics of interest. Furthermore, the graphical display visually indicates which segments of the transcript satisfy a user-specified interest level threshold, allowing the user to quickly identify segments of particular interest.

Visual indication of the location and frequency of segments of interest provides the user with information that can help the user determine how to modify the query or to adjust the interest level threshold. For example, in response to query results including a large number of segments satisfying the interest level threshold, the user may decide to restrict the query by adding search terms or to increase the interest level threshold.

The interactive graphical user interface used to interact with the search engine provides the user with immediate feedback in response to actions such as modification of the query and adjustment of the interest level threshold. For example, the graphical display of query results is constantly updated as the user modifies the query. Similarly, the graphical display indicating which transcript segments satisfy the interest level threshold is updated whenever the user modifies the interest level threshold. This interactivity facilitates and encourages an iterative process in which the user repeatedly modifies the query and other criteria in response to feedback from the visual display until sufficiently satisfactory results are obtained.

The immediate visual feedback provided to the user can increase the speed with which the user achieves satisfactory search results. Because query results are displayed as the query is being input, the user need not wait until the full query is entered before viewing the results. This allows the user to modify a partially-entered query in response to unsatisfactory or unexpected results. Immediate display of segments of interest in response to modification of the interest level threshold increases the speed with which the user can identify segments of interest.

The ability to jump from one segment of interest to another using the graphical user interface increases the speed with which the user can examine relevant portions of the transcript, and allows the user to quickly bypass information which is not likely to be interesting.

Displaying a graph of the confidence levels of words in the transcript allows the user to visually distinguish speech-rich portions of the transcript from regions containing non-speech data. This facilitates navigation through portions of the transcript containing speech.

Other features and advantages of the invention will become apparent from the following description and from the claims.

BRIEF DESCRIPTION OF THE DRAWINGS

FIG. 4 is a block diagram of a transcript.

DETAILED DESCRIPTION

Figure 1A:
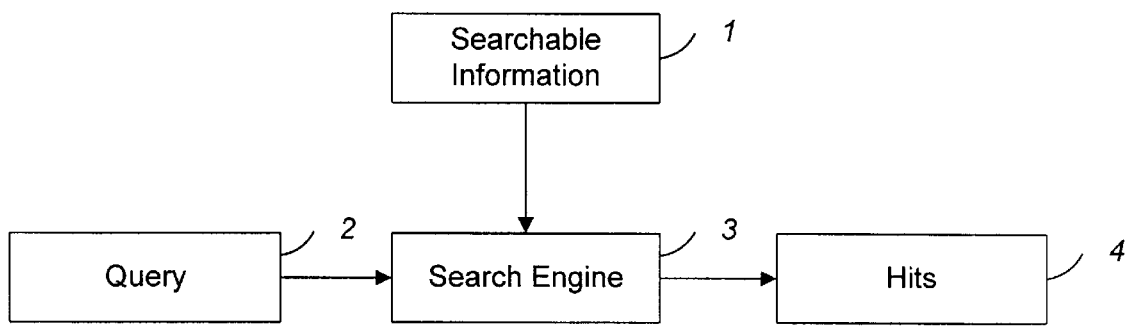
FIG. 1a is a block diagram of a computer-implemented query.
Figure 1B:
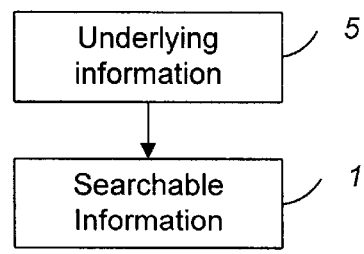
FIG. 1b is a block diagram of the relationship between underlying information and searchable information.
Figure 2:
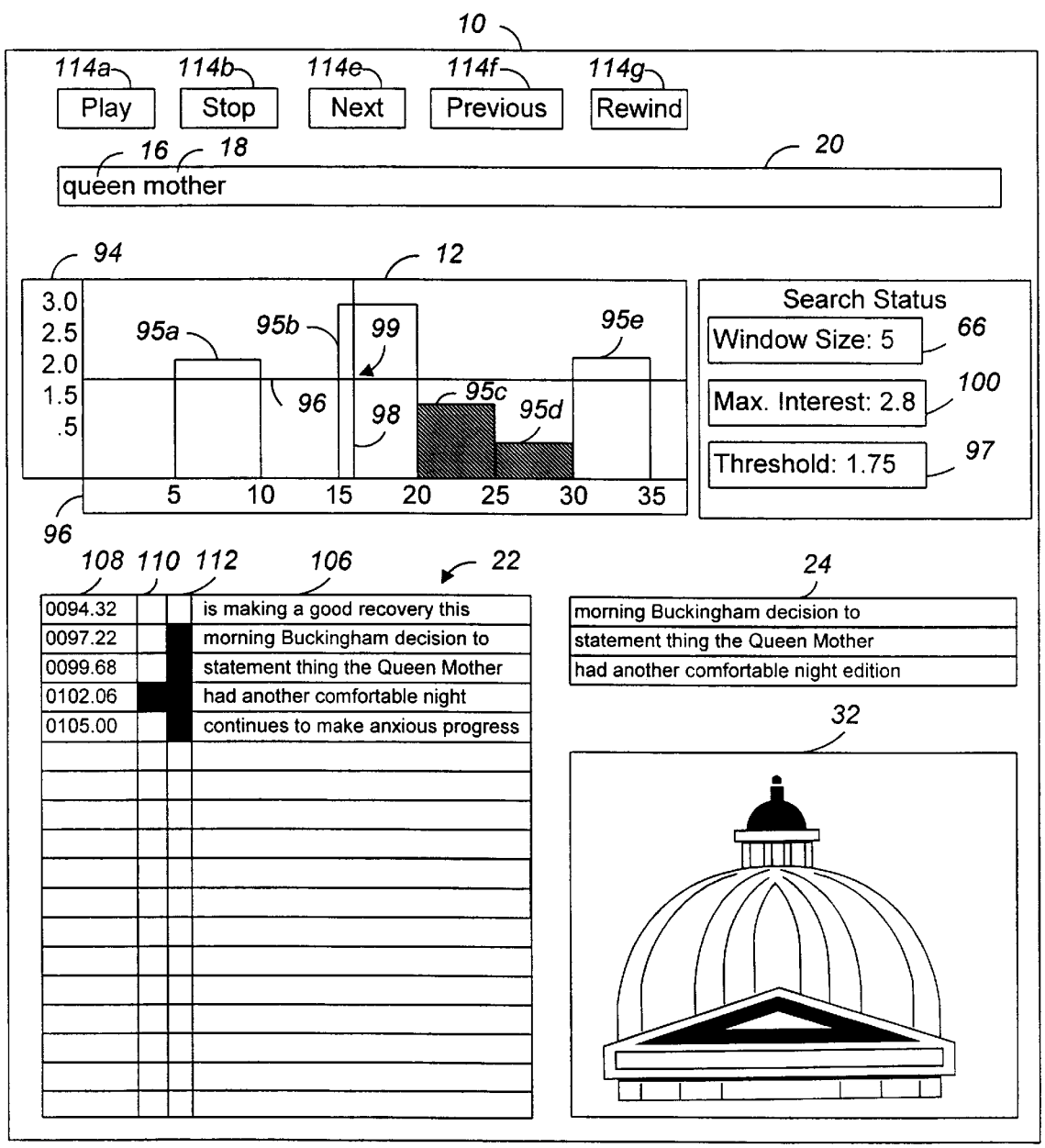
FIG. 2 is a block diagram of a graphical user interface to a search engine.

Referring to FIG. 2, to make it easier for a user to navigate through the results of a search made on a large file based on a certain query, a graphical user interface 10 is provided that not only allows the user to roam from hit to hit in the usual way, but also allows the user to understand and control the relationship between hits and levels of confidence that the hits are representative of underlying information that is of interest to the user. A result window 12 shows the user the number of hits that meet an interest level threshold, and where those hits are in the file being searched. The user can change the interest level threshold interactively, and the result window 12 immediately shows the effect of the change. In this way, the user can more quickly find the parts of the file that are of particular interest.

For example, the user may search a transcript 14 (FIG. 3) of recognized speech using the graphical user interface 10. The user types a query, consisting of a combination of words of interest 16, 18, into a query window 20. The result window 12 indicates the degree to which portions of the transcript 14 satisfy the query, and indicates which portions of the transcript 14 match the query particularly well. A transcript window 22 displays a portion of the transcript 14 and indicates which portions of the transcript 14 match the query particularly well. The user may replay a portion of the transcript, causing the portion of the transcript to be displayed in a current transcript window 24, while corresponding digitized audio 26 (FIG. 3) is played through speakers attached to a general-purpose computer 28 and corresponding digitized video 34 (FIG. 3) is displayed in a video window 32.

Figure 3:
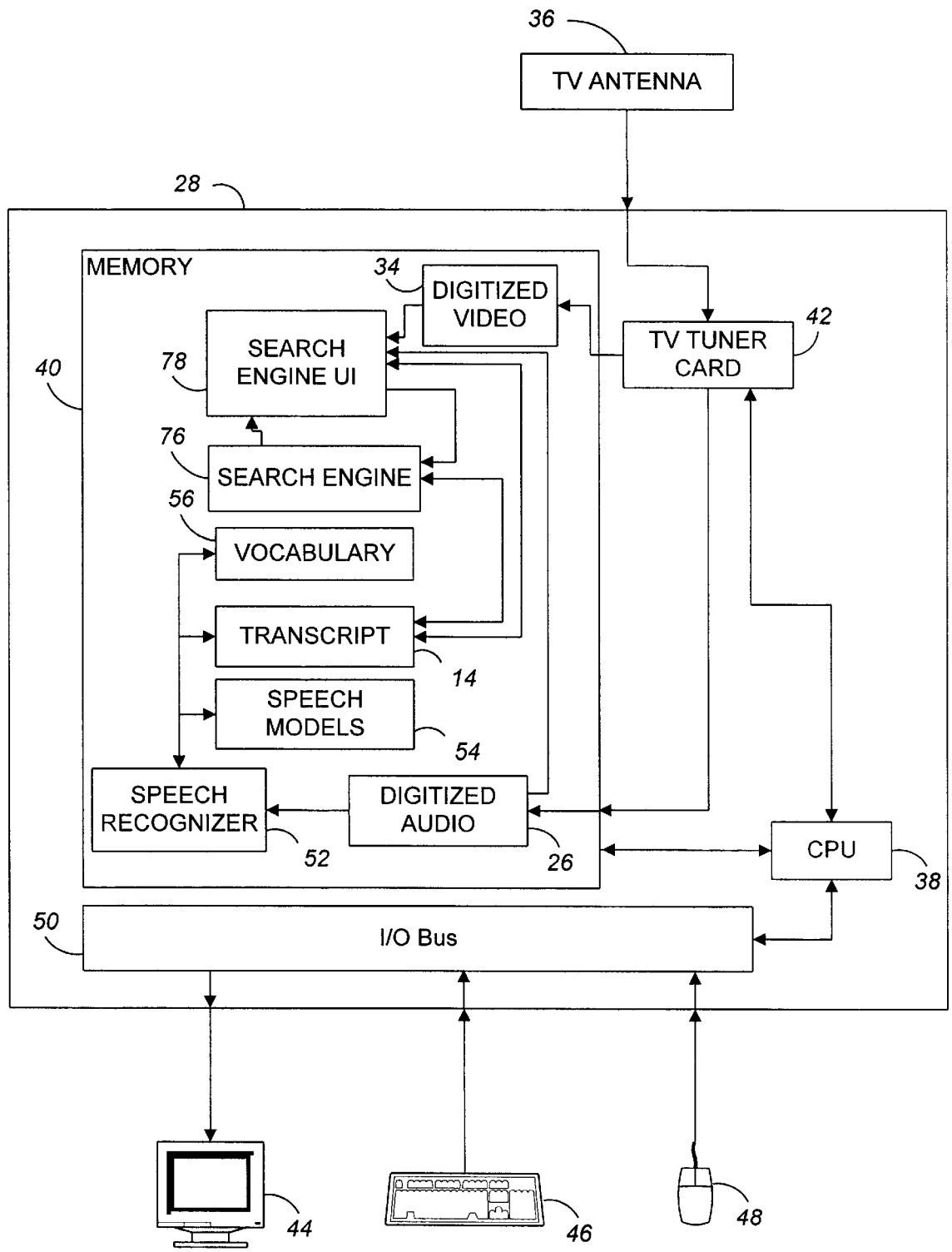
FIG. 3 is a block diagram of a computer.

Referring to FIG. 3, the transcript 14, digitized audio 26, and digitized audio 26 may be obtained as follows. A television antenna 36 transmits a broadcast television signal to a general purpose computer 28. The computer 28 has a central processing unit (CPU) 38 in communication with a memory 40 and a television tuner card 42. The CPU 38 communicates with input/output (I/O) devices such as a monitor 44 (for displaying, e.g., the graphical user interface 10), keyboard 46, and mouse 48 through an I/O bus 50. For ease of discussion, the following description indicates that the software components carry out operations to achieve specified results. However, it should be understood that each component actually causes the CPU 38 to operate in the specified manner. In addition, it should also be understood that the designation of different software components is for purposes of discussion and that other implementations may combine the functions of one or more components or may further divide the components.

The TV tuner card 42 extracts and digitizes the audio and video portions of a selected channel from the television signal, and stores them in the memory 40 of the computer 28 as digitized audio 26 and digitized video 34, respectively.

A speech recognizer process 52, part of, e.g., NaturallySpeaking™, available from Dragon Systems, Inc. of West Newton, Mass., recognizes words in the digitized audio 26 by comparing the digitized audio 26 to speech models 54 of words in a vocabulary 56. The speech recognizer process 52 identifies words in the vocabulary 56 that match utterances (e.g., words or sentences) in the digitized audio 26. The identified words are stored, in order, in transcript 14. After words have been stored in the transcript 14, phrase and sentence breaks may be inserted into the transcript 14 based on the length of pauses between words and the number of words since the last phrase or sentence break. Sentence breaks may, for example, be indicated in the transcript window 22 by displaying a period after the last word in each sentence and by capitalizing the first word in each sentence.

As shown in FIG. 4, transcript 14 contains confidence levels 58, start times 60, and end times 62 that the speech recognizer 52 has estimated for recognized words 80. A recognized word's start time and end time correspond to the beginning and end of the portion of the digitized audio 26 from which the recognized word was derived. Although the start times 60 and end times 62 in FIG. 4 are in hundredths of a second, start times 60 and end times 62 could be stored in, e.g., milliseconds or in an external time code, such as that specified by the Society of Motion Picture and Television Engineers (SMPTE). A recognized word's confidence level is a number between zero and one indicating an estimated likelihood that the recognized word is correct. For example, the recognized word "is" has a confidence level of 0.63, indicating a 63% likelihood that "is" corresponds to the portion of the digitized audio 26 with a start time of 3.72 seconds and an end time of 3.77 seconds.

When the user wants to search the transcript 14 for a topic of interest, the user enters a query consisting of a combination of words in the query window 20. For example, referring to FIG. 2, the user enters the query "queen mother" in the query window 20. The query is performed on equally-sized sections of the transcript 14 referred to as "windows." Each window in the transcript 14 corresponds to a segment in the digitized audio 26 and a corresponding segment in the digitized video 34 with a particular start time and end time. The user selects a uniform window size by typing a number of seconds into a window size box 66.

For example, if the window size is 5 seconds, then the first window in the transcript 14 is the text in the transcript 14 corresponding to the first five seconds of digitized audio 26 and digitized video 34, and the second window is the text in the transcript 14 corresponding to the next five seconds of digitized audio 26 and digitized video 34. Alternatively, transcript windows may overlap, in which case a user-configurable window delta value specifies the difference between the start times of consecutive transcript windows. For example, if the window size is five seconds and the window delta value is one second, the first window in the transcript 14 is the text in the transcript corresponding to the first five seconds of digitized audio 26 and digitized video 34, and the second window is the text of the transcript 14 corresponding to seconds 1 through 6 of digitized audio 26 and digitized video 34.

Figure 5:
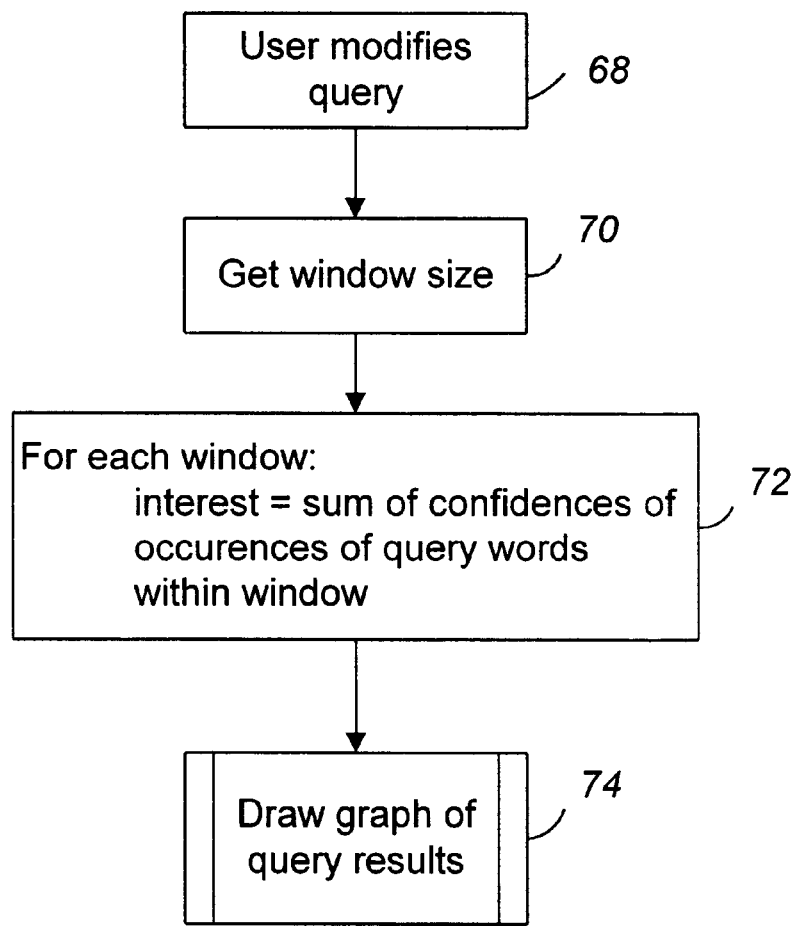
FIG. 5 is a flowchart of a method for performing and displaying results of a query.

Referring to FIG. 5, when the user enters a new query or modifies an existing query (step 68), the search engine 76 performs the query and a search engine UI process 78 graphically displays the query results in the result window 12. Modifying an existing query can include adding a single character to or deleting a single character from the query. As a result, the user can view the results of a query as the query is being modified. To make efficient use of system resources, the search engine UI process 78 may wait until the user pauses after pressing a key before performing a query. In this way, only one query will be performed after the user quickly enters a number of characters, rather than performing the query after the user enters each character. The search engine UI process 78 may also abort the query, if any, that is being performed, upon the user pressing a key. This allows a new query to be performed without waiting for a previous query to complete execution.

When performing a query, the search engine 76 may search for words with the same root as words in the query. For example, if "addiction" is a query term, the search engine 76 may search for "addict," "addiction," "addictive," and "addicted." The search engine 76 may also use other information retrieval techniques, e.g., searching for synonyms of words in the query, to search for words based on the query. The user may place a hyphen ("−") before a query term to indicate that any transcript window containing the query term should be assigned an interest level of zero. Conversely, if the user places a plus sign ("+") before a query term, then any transcript window not containing the query term will be assigned an interest level of zero.

To graphically display the results of a query, the process 78 obtains the window size entered by the user in window size box 66 (step 70). For each window in transcript 14, the process 78 calculates an "interest level" (step 94). An interest level represents the degree to which text in the window represents segments of interest in the digitized audio 26 and digitized video 34. An interest level is a function of (1) the extent to which the text in the transcript window accurately represents the words spoken in the digitized audio 26, and (2) the extent to which the text in the transcript window matches the query.

A window's interest level may be calculated, for example, as the sum of the confidences of each word in the transcript window matching a word in the query. For example, if the query is "queen mother," and a transcript window contains an occurrence of the word "queen" with a confidence level of 0.27, another occurrence of the word "queen" with a confidence level of 0.75, and an occurrence of the word "mother" with a confidence level of 0.82, then the window's interest level is 1.84 (0.27+0.75+0.82). Thus, multiple occurrences of a search word are all given weight in the interest level computation.

Figure 6:
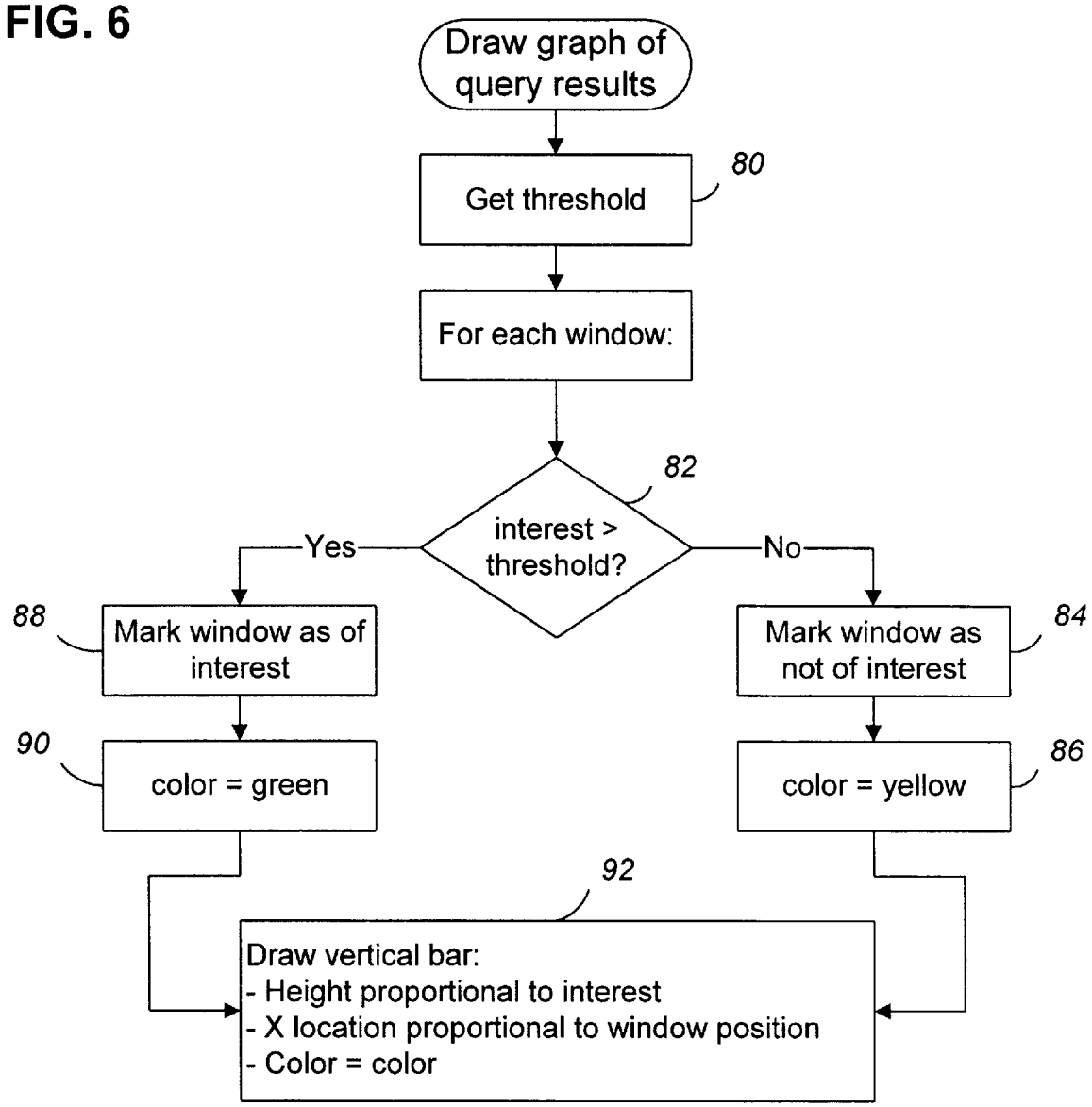
FIG. 6 is a flowchart of a method for graphically displaying results of a query.

The process 78 draws a bar chart graph of the query results in result window 12 (step 74), according to the procedure illustrated in FIG. 6. First, the process 78 obtains an interest level threshold specified by the user (step 80). For each window in the transcript, the process 78 determines whether the window's interest level is greater than the interest level threshold (decision step 82). If it is, then the window is marked as being a window of interest (step 80), and a variable color is set to green (step 90). If the window's interest level is not greater than the interest level threshold (decision step 82), then the window is marked as not being a window of interest (step 84), and the variable color is set to yellow (step 86).

The process 70 draws a bar in the result window 12 corresponding to the window as follows (step 92). The height of the bar, indicated on a vertical axis 94, is equal to the window's interest level. The horizontal position of the bar, indicated on a horizontal axis 96, corresponds to the time frame (in seconds) in the transcript 14 to which the window corresponds. The color of the bar is the color set in either step 86 or 90.

In the resulting graph, bars corresponding to windows whose interest level is greater than the user-specified interest level threshold are colored green, while other bars are colored yellow. This provides the user with a visual indication of which windows within the transcript 14 satisfy the user's interest level threshold. For example, as shown in FIG. 2, bars 95*a*, 95*b*, and 95*e* correspond to windows satisfying the interest level threshold, and are therefore colored green.

The process 78 graphically displays the interest level threshold with a horizontal interest level threshold line 96 in the result window 12. The user may adjust the value of the interest level threshold by dragging the interest level threshold line 96 up or down with the mouse 48 or other pointer, or by typing a value into an interest level threshold box 97. The process 78 displays the maximum interest level of all the transcript windows in a maximum interest level box 100.

Figure 7:
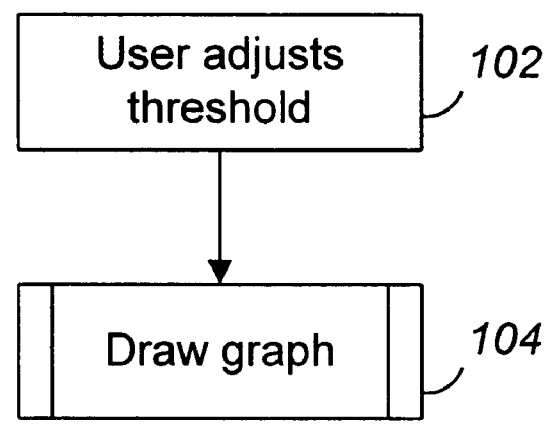
FIG. 7 is a flowchart of a method for updating a display in response to user input.
Figure 8A:
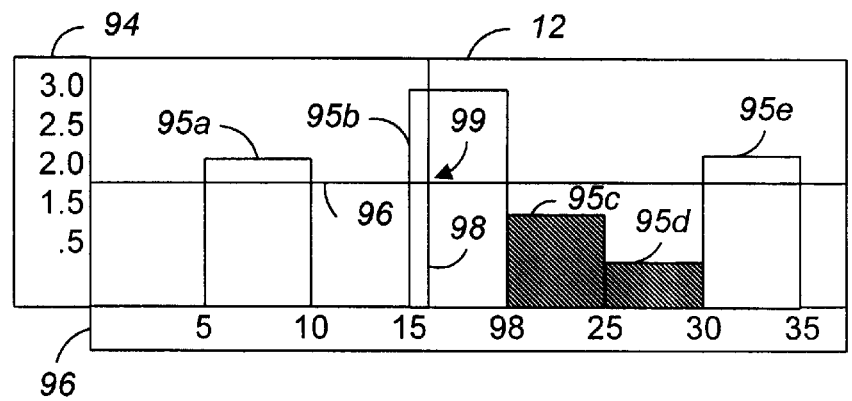
FIGS. 8a–c are block diagrams of graphical representations of query results.
Figure 8B:
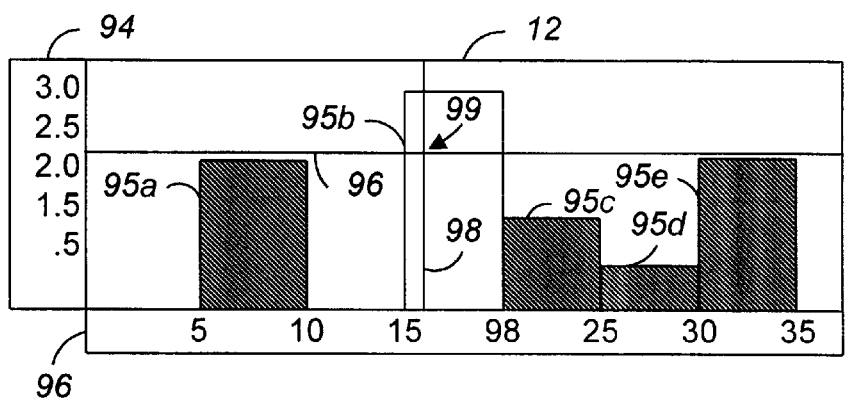
Figure 8C:
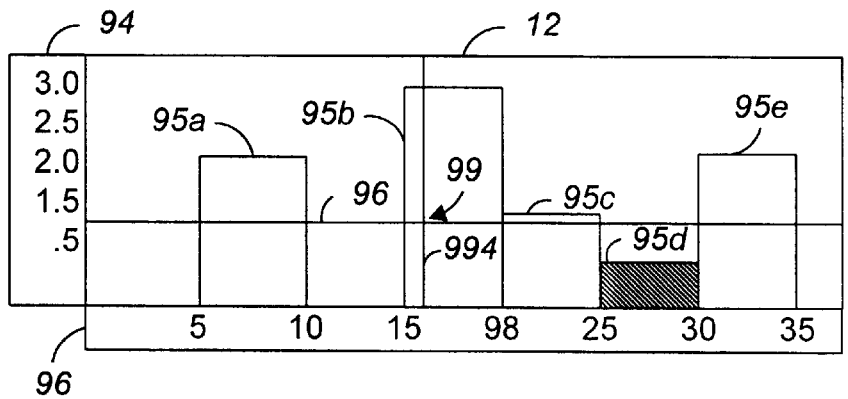

As shown in FIG. 7, whenever the user adjusts the interest level threshold (step 102), the process 78 redraws the result window 12 (step 104). FIG. 8*a* shows the result window 12 of FIG. 2. If, for example, the user moves the interest level threshold line 96 to the position shown in FIG. 8*b*, the result window 12 is redrawn so that the bar 95*b*, which extends higher than the interest level threshold line 96, is drawn in green and the remaining bars 95*a*, 95*c*, 95*d*, and 95*e* are drawn in yellow. Similarly, if the user moves the interest level threshold line 96 to the position shown in FIG. 8*c*, the result window 12 is redrawn so that the bars 95*a*, 95*b*, 95*c*, and 95*e*, which are taller than the interest level threshold line 96, are drawn in green and the remaining bar 95*d* is drawn in yellow.

The transcript window 22 displays phrases 106 from the transcript 14 and corresponding times 108. For example, as shown in FIG. 2, the phrase "is making a good recovery this" begins at 94.32 seconds into the transcript 14. Words whose confidence levels fall below a predetermined threshold may be displayed as ellipses (" . . . ") in the transcript window 22 rather than as words.

The process 78 maintains a pointer to a time within the transcript 14, referred to as the "current time." The current time is indicated by a current time line 98 in the result window 12. The user can change the current time by dragging the current time line 98 with the mouse 48 or other pointer device. The process 78 updates the video window 32 so that it always displays a frame from the digitized video 34 corresponding to the current time. Similarly, the process 78 updates the current transcript window 24 so that it always displays text from the transcript 14 corresponding to the current time. A darkened square in column 110 of the transcript window 22 indicates that the corresponding phrase is within the transcript window which includes the current time. Darkened squares in column 112 of the transcript window 22 indicate that the corresponding phrases are within transcript windows satisfying the interest level threshold.

The user may edit text in the current transcript window 24. If a user replaces a word in the current transcript window 24, the replaced word is deleted from the transcript 44 and replaced with the word typed by the user, which is assigned a confidence level of 1.0. Similarly, if a user adds a word in the current transcript window 24, the word is added to the transcript 14 with an appropriate start and end time and assigned a confidence level of 1.0.

The user may adjust the current time and the interest level threshold simultaneously by dragging point 99. Dragging point 99 to a new location has the combined effect of dragging the current time line 98 and the interest level threshold line 96, as described above. The process 78 may provide the user with the option of selecting a new position for the interest level threshold line 96 using the right mouse button, selecting a new position for the current time line 98 using the left mouse button, and selecting a new position for point 99 by dragging the point 22 with either mouse button.

Figure 9A:
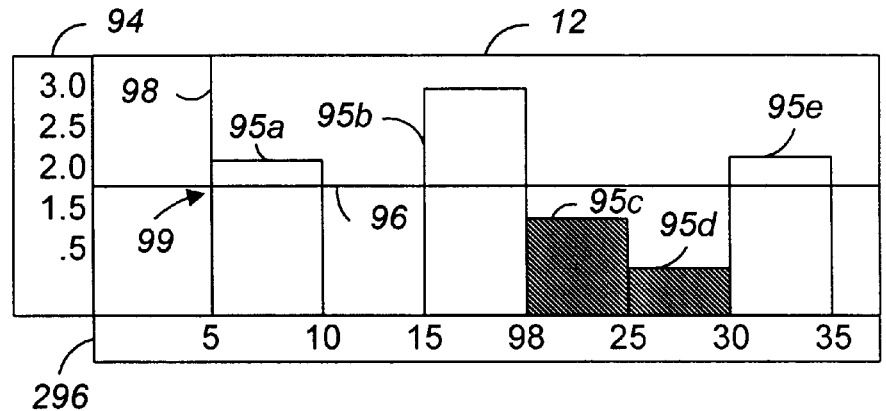
FIGS. 9a–c are block diagrams of graphical representations of query results.

The buttons 114*a–g* allow the user to navigate through the transcript 14 and to examine the windows with interest levels satisfying the interest level threshold. For example, referring to FIG. 9*a*, if the user presses the "Next" button 114*e* after performing a query, the current time line 98 moves to the beginning of bar 95*a*, which is the first bar in the result window 12 satisfying the interest level threshold. As described above, the search engine UI process 78 also displays text from the transcript 14 corresponding to the window 95*a* in the current transcript window 24, and displays a frame from the digitized video 34 corresponding to the beginning of the window 95*a* in video window 32.

Figure 9B:
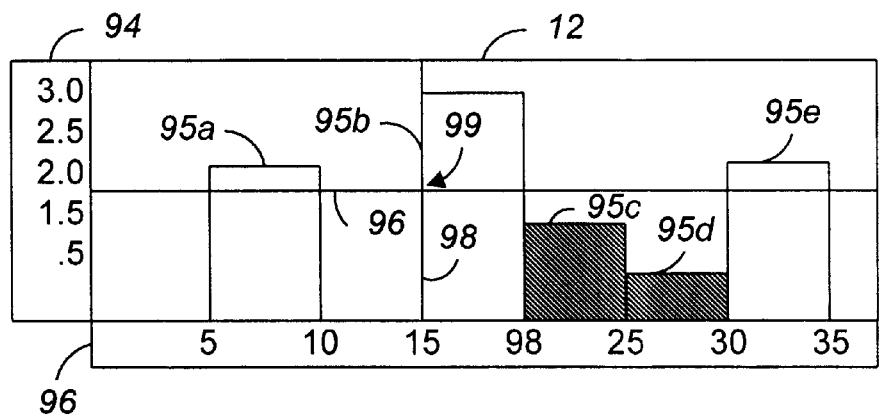
Figure 9C:
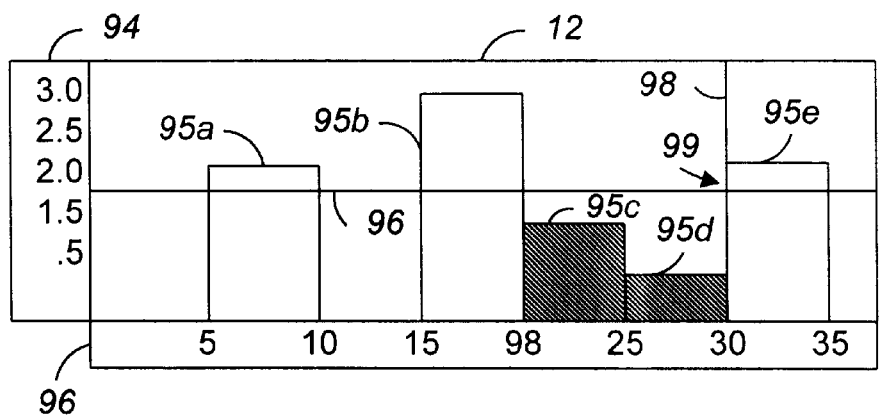

As shown in FIG. 9*b*, pressing the "Next" button 114*e* causes the search engine UI process 78 to move the current time line 98 to the beginning of bar 95*b*, because bar 95*b* is the next bar corresponding to a transcript window whose interest level satisfies the interest level threshold. As shown in FIG. 9*c*, pressing the "Next" button 114*e* again causes the search engine UI process 78 to move the current time line 98 to the beginning of bar 95*e*. The "Previous" button 114*f* performs the same function as the "Next" button 114*e*, except that it moves the current time line in the opposite direction.

Pressing the "Play" button 114*a* causes the search engine UI process 78 to play back the digitized audio 26 and digitized video 34 in real time beginning at the current time, and to continuously update the current time line 98 and the current transcript window 24 accordingly. Pressing the "Stop" button 114*b* terminates such playback. Pressing the "Rewind" button 114*g* sets the current time to zero.

Figure 10:
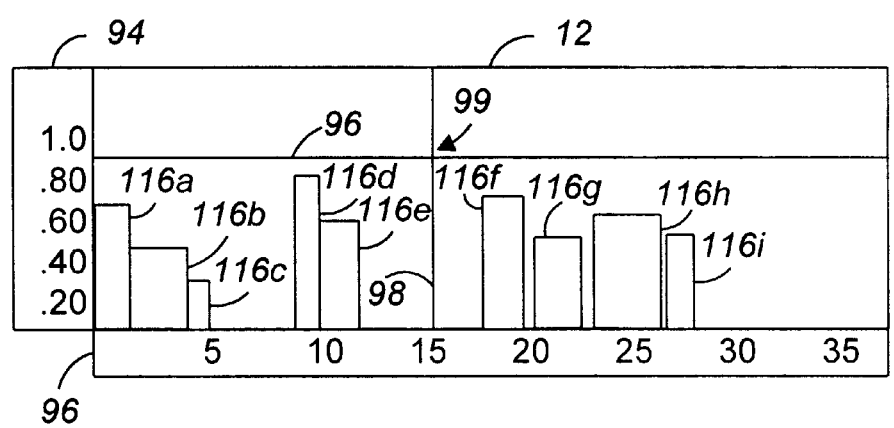
FIG. 10 is a block diagram of a graphical representation of confidence levels of words in a transcript.

Referring to FIG. 10, if the query window 20 is empty, then the process 78 displays a bar chart graph of the confidence levels of the words in the transcript 14. In the bar chart of FIG. 10, the heights of the bars 116*a–i* correspond to the confidence levels of individual words in the transcript 14, and the widths of the bars 116*a–i* correspond to the durations (i.e., end time minus start time) of words in the transcript 14. Note that the vertical axis 94 is labeled with confidence levels ranging from 0 through 1.0. Absence of any bars corresponding to a particular window of time indicates that the speech recognizer 52 did not recognize any speech during that time.

Although elements of the invention are described in terms of a software implementation, the invention may be implemented in software or hardware or firmware, or a combination of the three.

Other embodiments include, but are not limited to, the following. The underlying information 5 could be other than digitized audio 26 and digitized video 34. For example, the underlying information 5 could be audio alone. The underlying information 5 could be a text file containing a transcript of a deposition, in which case the text file would also be the searchable information 1. The confidence levels associated with words in the searchable information could all be either zero or one rather than continuous values ranging between zero and one.

Queries can be other than keywords connected by boolean operators. For example, a query may indicate topics, and the search engine 3 may identify portions of the underlying information 5 relating to those topics by means other than text pattern matching. Queries may include directives to search for particular classes of words (e.g., proper names or nouns) or for words occurring with greater than a specified frequency.

Confidence levels could represent information other than the accuracy of speech recognition. Confidence levels could, for example, represent likelihoods that the sentence topics have been correctly identified in a system for tracking topics within a stream of text. Alternatively, confidence levels could represent likelihoods that word and sentence boundaries have been correctly identified by a speech recognizer.

An interest level may be other than a sum of confidence levels. An interest level may weight the confidence levels of user-specified words more heavily than the confidence levels of other words, or may weight words differently based on their order of appearance in the query.

The result window 12 could display information about the results of a query using a graphical representation other than a bar chart, and the interest level threshold and current time could be manipulable by means other than the mouse 48 or other pointer. For example, a line chart could be used instead of a bar chart. The interest level threshold could vary over the transcript instead of being a fixed value. For example, the interest level threshold could be calculated as a moving average of interest level thresholds, and a window could be classified as a window of interest if its interest level is greater than the current moving average.

Other embodiments are within the scope of the following claims.

What is claimed is:

1. A computer-implemented method that enables a user to control a search of a file that represents underlying raw information, and to find parts of the file that represent material of interest in the raw information, the method comprising:

enabling the user to define criteria applicable to the file and intended to locate parts of the file that tend to represent material in the raw information that may be of interest to the user;

searching the file in accordance with the criteria to find parts of the file that meet the criteria;

defining a measure of the degree to which the found parts represent material in the raw information that is of interest to the user; and providing an interactive user interface which displays to the user the relationship between the found parts of the file and values of the defined measure with respect to the found parts and which changes the display in response to changes made by the user to a threshold associated with the defined measure.

2. The method of claim 1, wherein the underlying raw information comprises speech.

3. The method of claim 2, wherein the file comprises text produced by a speech recognizer.

4. The method of claim 1, wherein the underlying raw information comprises text.

5. The method of claim 1, wherein the criteria comprise the presence of a particular utterance in speech.

6. The method of claim 1, wherein the interactive user interface displays to the user which found parts of the file satisfy the threshold.

7. The method of claim 6, wherein changing the display comprises displaying to the user which found parts of the file satisfy the changed threshold.

8. The method of claim 1, wherein the defined measure relates to confidence levels.

9. The method of claim 8, wherein confidence levels are descriptive of degrees to which parts of the file correspond to parts of the raw information.

10. The method of claim 8, wherein the interactive user interface displays a bar chart with bars representing the relationship between the found parts of the file and values of the defined measure.

11. The method of claim 10, wherein the bar chart indicates the locations of the found parts within the file.

12. The method of claim 10, wherein the user changes the threshold to a new value by indicating a location on the bar chart corresponding to the new value.

13. The method of claim 12, wherein the user indicates a location on the bar chart using a pointer device.

14. The method of claim 1, wherein the interactive user interface further displays to the user a representation of the raw information.

15. The method of claim 14, wherein the interactive user interface displays a representation of a part of the raw information corresponding to a part of the file indicated by the user.

16. A computer-implemented method that enables a user to control a search of a text file that represents speech produced by a speech recognizer, and to find parts of the text file that represent a particular utterance in the speech, the method comprising:

enabling the user to define a query applicable to the text file and intended to locate parts of the text file that tend to represent the particular utterance in the speech;

searching the text file in accordance with the query to find parts of the text file that meet the query;

defining a measure of the degree to which the found parts represent the particular utterance, the defined measure relating to confidence levels descriptive of degrees to which parts of the text file correspond to parts of the speech; and providing an interactive user interface which:

displays to the user a bar chart with bars representing the relationship between the found parts of the text file and values of the defined measure with respect to the found parts;

indicates the locations of the found parts within the text file;

displays to the user which found parts of the text file satisfy a threshold associated with the defined measure; and which changes the display in response to changes made by the user to the threshold.

17. A computer program tangibly stored on a computer-readable medium and operable to cause a computer to enable a user to control a search of a file that represents underlying raw information, and to find parts of the file that represent material of interest in the raw information, the computer program comprising instructions to:

enable the user to define criteria applicable to the file and intended to locate parts of the file that tend to represent material in the raw information that may be of interest to the user;

search the file in accordance with the criteria to find parts of the file that meet the criteria;

define a measure of the degree to which the found parts represent material in the raw information that is of interest to the user; and provide an interactive user interface which displays to the user the relationship between the found parts of the file and values of the defined measure with respect to the found parts and which changes the display in response to changes made by the user to a threshold associated with the defined measure.

18. The computer program of claim 17, wherein the underlying raw information comprises speech.

19. The computer program of claim 18, wherein the file comprises text produced by a speech recognizer.

20. The computer program of claim 17, wherein the underlying raw information comprises text.

21. The computer program of claim 17, wherein the criteria comprise the presence of a particular utterance in speech.

22. The computer program of claim 17, wherein the interactive user interface displays to the user which found parts of the file satisfy the threshold.

23. The computer program of claim 22, wherein instructions to change the display comprises instructions to display to the user which found parts of the file satisfy the changed threshold.

24. The computer program of claim 17, wherein the defined measure relates to confidence levels.

25. The computer program of claim 24, wherein confidence levels are descriptive of degrees to which parts of the file correspond to parts of the raw information.

26. The computer program of claim 24, wherein the interactive user interface displays a bar chart with bars representing the relationship between the found parts of the file and values of the defined measure.

27. The computer program of claim 26, wherein the bar chart indicates the locations of the found parts within the file.

28. The computer program of claim 26, wherein the user changes the threshold to a new value by indicating a location on the bar chart corresponding to the new value.

29. The computer program of claim 28, wherein the user indicates a location on the bar chart using a pointer device.

30. The computer program of claim 17, wherein the interactive user interface further displays to the user a representation of the raw information.

31. The computer program of claim 30, wherein the interactive user interface displays a representation of a part of the raw information corresponding to a part of the file indicated by the user.

32. A computer program tangibly stored on a computer-readable medium and operable to cause a computer to enable a user to control a search of a file that represents underlying raw information, and to find parts of the file that represent material of interest in the raw information, the computer program comprising instructions to:

enable the user to define a query applicable to the text file and intended to locate parts of the text file that tend to represent the particular utterance in the speech;

search the text file in accordance with the query to find parts of the text file that meet the query;

define a measure of the degree to which the found parts represent the particular utterance, the defined measure relating to confidence levels descriptive of degrees to which parts of the text file correspond to parts of the speech; and provide an interactive user interface which:
   displays to the user a bar chart with bars representing the relationship between the found parts of the text file and values of the defined measure with respect to the found parts;
   indicates the locations of the found parts within the text file;
   displays to the user which found parts of the text file satisfy a threshold associated with the defined measure; and which
   changes the display in response to changes made by the user to the threshold.

* * * * *

UNITED STATES PATENT AND TRADEMARK OFFICE
CERTIFICATE OF CORRECTION

PATENT NO. : 6,112,172
DATED : August 29, 2000
INVENTOR(S) : Sean D. True and Jonathan Hood Young It is certified that error appears in the above-identified patent and that said Letters Patent is hereby corrected as shown below:

Column 10,
Line 52, cancel beginning with "32. A computer program" to and including "to the threshold."

Column 12,
Line 5, insert the following:
-- 32. A computer program tangibly stored on a computer-readable medium and operable to cause a computer to enable a user to control a search of a text file that represents speech produced by a speech recognizer, and to find parts of the text file that represent a particular utterance in the speech, the computer program comprising instructions to:

enable the user to define a query applicable to the text file and intended to locate parts of the text file that tend to represent the particular utterance in the speech;

search the text file in accordance with the query to find parts of the text file that meet the query;

define a measure of the degree to which the found parts represent the particular utterance, the defined measure relating to confidence levels descriptive of degrees to which parts of the text file correspond to parts of the speech; and provide an interactive user interface which:

displays to the user a bar chart with bars representing the relationship between the found parts of the text file and values of the defined measure with respect to the found parts;

indicates the locations of the found parts within the text file;

displays to the user which found parts of the text file satisfy a threshold associated with the defined measure; and which changes the display in response to changes made by the user to the threshold. --

Signed and Sealed this

Ninth Day of April, 2002

*Attest:*

*Attesting Officer*

JAMES E. ROGAN
*Director of the United States Patent and Trademark Office*